United States Patent
Srivastava et al.

(10) Patent No.: US 12,028,295 B2
(45) Date of Patent: Jul. 2, 2024

(54) GENERATING A CHATBOT UTILIZING A DATA SOURCE

(71) Applicant: INTERNATIONAL BUSINESS MACHINES CORPORATION, Armonk, NY (US)

(72) Inventors: Biplav Srivastava, Rye, NY (US); Rahul Nahar, South Burlington, VT (US)

(73) Assignee: International Business Machines Corporation, Armonk, NY (US)

( * ) Notice: Subject to any disclaimer, the term of this patent is extended or adjusted under 35 U.S.C. 154(b) by 480 days.

(21) Appl. No.: 17/247,621

(22) Filed: Dec. 18, 2020

(65) Prior Publication Data

US 2022/0200935 A1    Jun. 23, 2022

(51) Int. Cl.
*H04L 51/02* (2022.01)
*G06F 9/445* (2018.01)
*G06F 16/9032* (2019.01)

(52) U.S. Cl.
CPC .......... *H04L 51/02* (2013.01); *G06F 9/44505* (2013.01); *G06F 16/90332* (2019.01)

(58) Field of Classification Search
None
See application file for complete search history.

(56) References Cited

U.S. PATENT DOCUMENTS

| | | | |
|---|---|---|---|
| 5,560,005 A * | 9/1996 | Hoover | G06F 16/27 |
| 2019/0012371 A1* | 1/2019 | Campbell | G06F 16/3329 |
| 2019/0121850 A1 | 4/2019 | Banerjee | |
| 2019/0124020 A1* | 4/2019 | Bobbarjung | H04L 51/02 |
| 2019/0132264 A1 | 5/2019 | Jafar Ali | |
| 2020/0005117 A1 | 1/2020 | Yuan | |
| 2020/0150839 A1 | 5/2020 | Roisman | |
| 2020/0334740 A1* | 10/2020 | Bedell | G06Q 30/0641 |
| 2022/0050968 A1* | 2/2022 | Xie | H04L 51/02 |

OTHER PUBLICATIONS

Androutsopoulos, et al., "Natural Language Interfaces to Databases—An Introduction," Cornell University, 1995, 50 pages.
Anonymous, "Chatbot in Customer Service," Accenture Interactive, 2016, 13 pages, Retrieved from the Internet: <URL: https://www.accenture.com/t00010101T000000_w_/br-pt/_acnmedia/PDF-45/Accenture-Chatbots-Customer-Service.pdf>.
(Continued)

*Primary Examiner* — Antim G Shah
(74) *Attorney, Agent, or Firm* — Elliot J. Shine

(57) ABSTRACT

A method, computer system, and a computer program product for chatbot generating is provided. The present invention may include determining one or more entities based on at least one column header of a dataset. The present invention may include determining one or more actions based on an associated row, the associated row corresponding to the at least one column header. The present invention may include generating a conversation environment, wherein the conversation environment comprises pairing the one or more entities with the one or more supplied intents of a chatbot workspace and pairing the one or more actions with one or more supplied utterances of the chatbot workspace.

19 Claims, 5 Drawing Sheets

(56) References Cited

OTHER PUBLICATIONS

Brennan, "Conversation with and through computers," SpringerLink abstract, Mar. 1991 [accessed on Jul. 14, 2020], 9 pages, Retrieved from the Internet: <URL: https://link.springer.com/article/10.1007/BF00158952>.

Chen, et al., "A Survey on Dialogue Systems: Recent Advances and New Frontiers," arxiv.org, Jan. 11, 2018, 13 pages, arXiv:1711.01731v3, Retrieved from the Internet: <URL: https://arxiv.org/pdf/1711.01731.pdf>.

Chu-Carroll, "MIMIC: An Adaptive Mixed Initiative Spoken Dialogue System for Information Queries," www.aclweb.org, Apr. 2000, pp. 97-104, Retrieved from the Internet: <URL: https://www.aclweb.org/anthology/A00-1014/>.

Daniel, et al., "Toward truly personal chatbots: on the development of custom conversational assistants," ResearchGate, May 2018, 7 pages, Retrieved form the Internet: <https://www.researchgate.net/publication/326728575_Toward_truly_personal_chatbots_on_the_development_of_custom_conversational_assistants>.

Disclosed Anonymously, "Chatbots, a Game Changer for Banking & Healthcare, Saving $8 Billion Annually By 2022," www.juniperresearch.com, May 2017 [accessed on Jul. 7, 2020], 4 pages, Retrieved from the Internet: <URL: https://www.juniperresearch.com/press/press-releases/chatbots-a-game-changer-for-banking-healthcare>.

Horvitz, et al., "A Computational Architecture for Conversation," Jun. 1999, 10 pages, Retrieved from the Internet: <URL: https://www.microsoft.com/en-us/research/publication/computational-architecture-conversation/>.

Inouye, "Minimizing the Length of Non-Mixed Initiative Dialogs," ACLstudent '04: Proceedings of the ACL 2004 workshop on Student research, Jul. 2004, 6 pages, ACM Digital Library, DOI: 10.3115/1219079.1219081, Retrieved from the Internet: <URL: https://dl.acm.org/doi/abs/10.3115/1219079.1219081>.

McTear, e t al., "Conversational Interfaces: Patent and Present," SpringerLink abstract, May 2016 [accessed on Jul. 14, 2020], 13 pages, Retrieved from the Internet: <URL: https://link.springer.com/chapter/10.1007/978-3-319-32967-3_4>.

Mell, et al., "The NIST Definition of Cloud Computing", National Institute of Standards and Technology, Special Publication 800-145, Sep. 2011, 7 pages.

Neff, et al., "Talking to Bots: Symbiotic Agency and the Case of Tay," International Journal of Communication, 2016, pp. 4915-4931, Retrieved from the Internet: <URL: https://ora.ox.ac.uk/catalog/uuid:613f7303-8a07-4f5a-ada2-b495c9a449af/download_file?file_format=pdf&safe_filename=Neff_Nagy_2016_Talking%2BTo%2BBots.pdf&type_of_work=Journal+article>.

Sheinin, et al., "QUEST: A Natural Language Interface to Relational Databases," 2018, 5 pages, Retrieved from the Internet: <URL: http://www.lrec-conf.org/proceedings/lrec2018/pdf/1100.pdf>.

Vera Liao, et al., "A Measure for Dialog Complexity and its Application in Streamlining Service Operations," arxiv.org, Aug. 4, 2017, arXiv:1708.04134v1, Retrieved from the Internet: <URL: https://arxiv.org/pdf/1708.04134.pdf>.

Young, et al., "POMDP-based Statistical Spoken Dialogue Systems: a Review," PROC IEEE, 2013, 18 pages, vol. 101, No. 5, Retrieved from the Internet: <URL: http://mi.eng.cam.ac.uk/~sjy/papers/ygtw13.pdf>.

* cited by examiner

GENERATING A CHATBOT UTILIZING A DATA SOURCE

BACKGROUND

The present invention relates generally to the field of computing, and more particularly to chatbot systems.

A chatbot is a computer program that may be designed to simulate human conversation. Users may communicate with chatbots using a chat interface or via voice, just like they would converse with another person. Chatbots may interpret words given to them by a user and provide a pre-set answer. Chatbots may be particularly useful in the business context. A business may build a chatbot to improve user experience (e.g., customer service), lower costs and/or deploy novel applications, among other things.

Chatbot systems may work around the notions of intent, entities, and action. When the user makes an utterance, which may be a statement or question, the system may try to recognize the user's intent from a library of choices and decide what action to take.

SUMMARY

Embodiments of the present invention disclose a method, computer system, and a computer program product for chatbot generating. The present invention may include determining one or more entities based on at least one column header of a dataset. The present invention may include determining one or more actions based on an associated row, the associated row corresponding to the at least one column header. The present invention may include generating a conversation environment, wherein the conversation environment comprises pairing the one or more entities with the one or more supplied intents of a chatbot workspace and pairing the one or more actions with one or more supplied utterances of the chatbot workspace.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
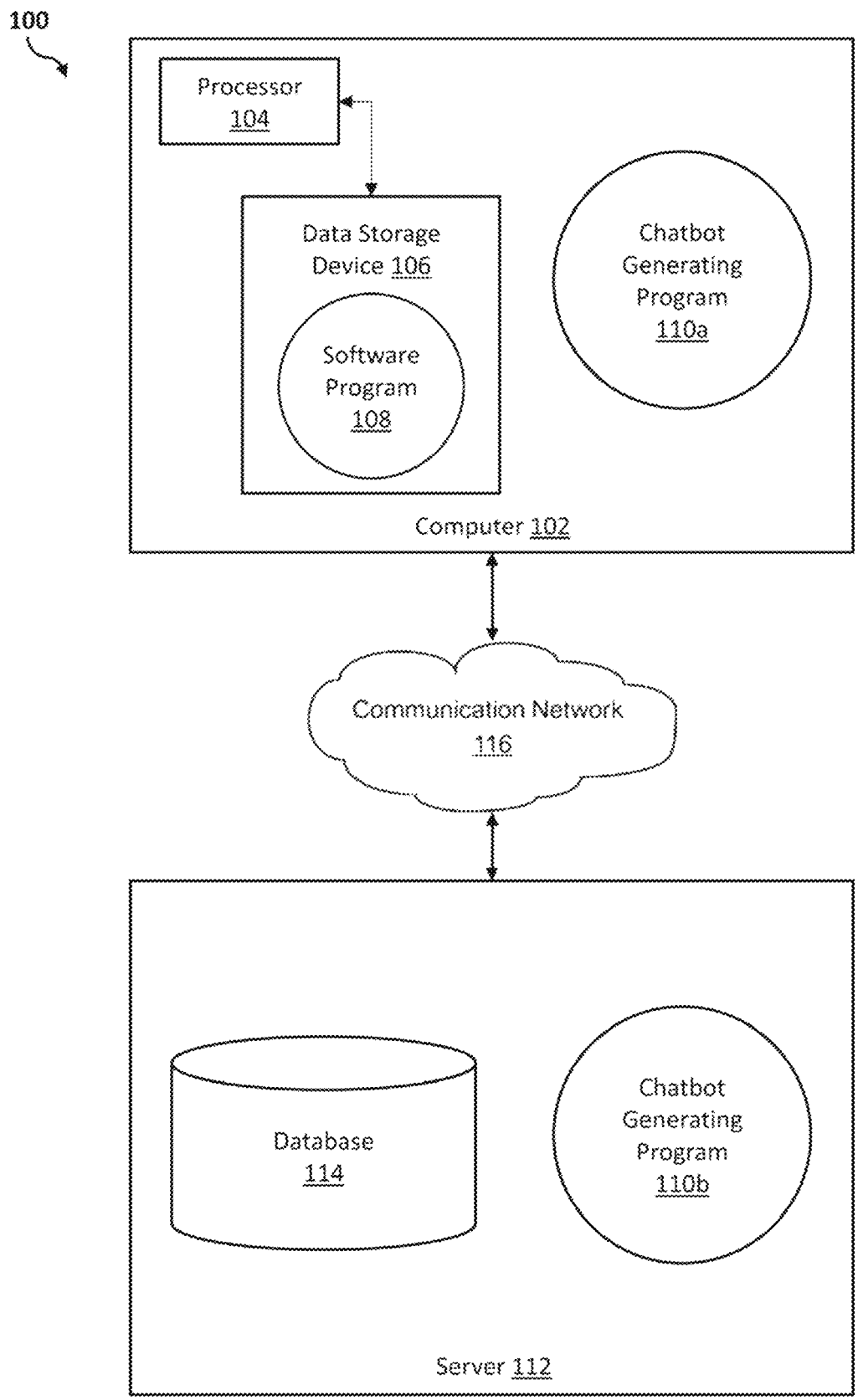
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for generating chatbots. As such, the present embodiment has the capacity to improve the technical field of chatbot systems by utilizing column headers of a dataset to determine one or more entities and utilizing supplied intents, supplied utterances, and supplied actions to leverage the one or more entities to generate a conversation environment specific to the dataset in a chatbot platform agnostic file. More specifically, the present invention may include determining one or more entities based on at least one column header of a dataset. The present invention may include determining one or more actions based on an associated row, the associated row corresponding to the at least one column header. The present invention may include generating a conversation environment, wherein the conversation environment comprises pairing the one or more entities with the one or more supplied intents of a chatbot workspace and pairing the one or more actions with one or more supplied utterances of the chatbot workspace.

As described previously, a chatbot is a computer program that may be designed to simulate human conversation. Users may communicate with chatbots using a chat interface or via voice, just like they would converse with another person. Chatbots may interpret words given to them by a user and provide a pre-set answer. Chatbots may be particularly useful in the business context. A business may build a chatbot to improve user experience (e.g., customer service), lower costs and/or deploy novel applications, among other things.

Chatbot systems may work around the notions of intent, entities, and action. When the user makes an utterance, which may be a statement or question, the system may try to recognize the user's intent from a library of choices and decide what action to take.

Therefore, it may be advantageous to, among other things, analyze a dataset, determine one or more entities about which user may ask questions as reflected in the intents, utilize a chatbot workspace, and generate a conversation environment.

According to at least one embodiment, the present invention may improve the ability of an organization desiring a chatbot to build a chatbot efficiently to answer questions leveraging the knowledge as reflected in the dataset they want to expose to the users.

According to at least one embodiment, the present invention may improve the effectiveness of customer service by determining one or more entities based on at least one column header within the dataset and generating a conversation environment.

According to at least one embodiment, the present invention may improve the building of chatbots by determining a chatbot platform, generating a chatbot platform specific file, and initializing a chatbot on the chatbot platform.

According to at least one embodiment, the present invention may improve chatbot systems by leveraging the one or more entities using to create intents, utterances, and actions to generate the conversation environment, wherein the conversation environment is able to answer questions in natural language specific to the dataset.

According to at least one embodiment, the present invention may improve the conversation environment of chatbot systems by training the conversation environment based on generated utterances to recognize the user intent and updating the chatbot workspace based on the corresponding actions which get answers from the dataset.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a chatbot generating program 110a. The networked computer environment 100 may also include a server 112 that is enabled to run a chatbot generating program 110b that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 3, server computer 112 may include internal components 902a and external components 904a, respectively, and client computer 102 may include internal components 902b and external components 904b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the chatbot generating program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the chatbot generating program 110a, 110b (respectively) to analyze a dataset, determine one or more entities, utilize a chatbot workspace, and generate a conversation environment. The chatbot generating method is explained in more detail below with respect to FIG. 2.

Figure 2:
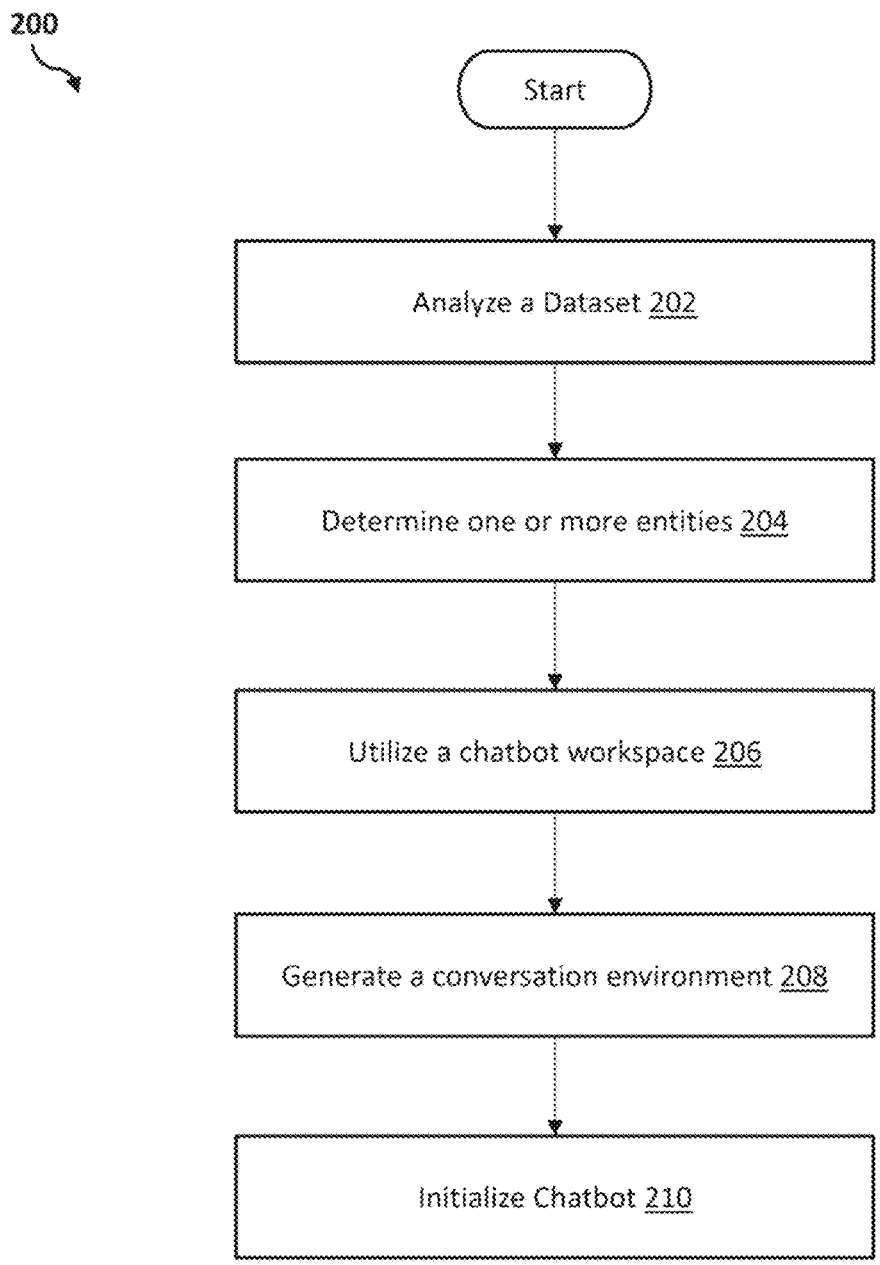
FIG. 2 is an operational flowchart illustrating a process for chatbot generating according to at least one embodiment.

Referring now to FIG. 2, an operational flowchart illustrating the exemplary chatbot generating process 200 used by the chatbot generating program 110a and 110b (hereinafter chatbot generating program 110) according to at least one embodiment is depicted.

At 202, the chatbot generating program 110 analyzes a dataset. The dataset may be a spreadsheet file (e.g., XLS file, XLSX file, CSV file, HTML report, any structured data file) created in a spreadsheet program (e.g., a spreadsheet generating computer program). The spreadsheet may be comprised of one or more worksheets, which may store and display data in a table format. The table format may be comprised of cells. Cells may be further comprised of columns and rows, with each column having a column header. A cell may contain data in different forms (e.g., data types, data forms), which may include, but is not limited to including, labels, numbers, dates, and formulas. The chatbot generating program 110 will analyze the dataset to generate metadata of data included in the spreadsheet. Metadata may be data that provides information about data. Metadata may be used by chatbot generating program 110 to generate relevant utterances a user might use to ask for information from the chatbot.

The dataset may be provided by a user. The user may provide additional information to the chatbot generating program 110 in addition to the dataset.

The chatbot generating program 110 may analyze the dataset utilizing one or more techniques of introspection in conjunction with Natural Language Processing (NLP). The chatbot generating program 110 may analyze the dataset utilizing one or more techniques of introspection in conjunction with NLP to extract features from the dataset based on at least the label of the column header, the data in one or more associated rows (e.g., rows below the column header), a data type of the data in the associated rows, a range of values (e.g., value distribution) of the associated rows, whether the associated rows are comprised of continuous or categorial variables, meta-data across columns, amongst other things.

For example, a dataset for New York City restaurants may be comprised of column headers such as, but not limited to, restaurant name, address, location, phone number, cuisine type, price point, date opened, and sanitation score, amongst others. The corresponding data may be listed in varying forms in the rows below the column headers. The data in the rows may vary with respect to value distributions as well as form (e.g., type of data). The chatbot generating program 110 may utilize the metadata in this example to identify what kind of information a user might want from a chatbot and how might they phrase the question (e.g., utterances).

At 204, the chatbot generating program determines one or more entities. The chatbot generating program 110 may determine the one or more entities based on the column headers of the dataset.

The chatbot generating program 110 may utilize the one or more entities determined based on the column headers of the dataset to generate a conversation environment, as will be described in more detail below with respect to step 208, the conversation environment may be comprised of at least entities, intents, utterances to allow the system to recognize the intents, and actions to get the answers to those intents. An intent may be the purpose or goal of an utterance. The intent may represent an action a chatbot should take based on an utterance. An utterance may be used to recognize to train the system to an intent of a user and one or more entities related to that intent. For example, intent could be a status of a document and the related entity could be document identification (document ID).

The one or more entities may be nouns such as, but not limited to, date, time, cities, names, brands, amongst others. An entity may represent parameters required to execute the action.

The chatbot generating program 110 may utilize the associated rows (e.g., rows below the column header) to derive actions. The chatbot generating program 110 may utilize the one or more entities to determine one or more actions based on an associated row, the associate row corresponding to a column header.

For example, an utterance may be "list Italian restaurants in Brooklyn," the user's intent is to retrieve a list of restaurants. The chatbot generation program 110 may designate intents using a verb and a noun, for example, here, the chatbot generation program 110 may use "listRestaurants." In this example, the entities may be "restaurantType" with value "Italian" and "restaurantLocaton" with value "Brooklyn." Here, the chatbot generating program 110 may utilize the associated rows to derive actions by searching the associated rows for "Italian" and "Brooklyn" and generating a list of restaurants that meet both criteria.

At 206, the chatbot generation program 110 utilizes a chatbot workspace. The chatbot workspace may be comprised of supplied intents, supplied utterances (e.g., question, request) associated with those intents and actions (e.g., answers).

The chatbot workspace may be utilized by pairing one or more determined entities with one or more supplied intents. The chatbot workspace may pair the one or more determined actions with one or more supplied intents.

The chatbot workspace may be utilized to determine one or more intents and one or more utterances based on the one or more entities determined based on the column headers of the dataset and the one or more actions determined based on the associated rows of the dataset.

Supplied utterances may be questions frequently asked by users of chatbot systems. Supplied actions may be answers to the questions frequently asked by users of chatbot systems.

The chatbot workspace may be stored using a platform agnostic file format. The platform agnostic file may be a canonical workspace file can then be converted to platform specific file to generate a chatbot on one or more chatbot platforms.

At 208, the chatbot generation program 110 generates a conversation environment. The conversation environment may be comprised of, at least, intents, entities, utterances (i.e., questions), and actions (i.e., answers). The intents, the entities, the utterances, and the actions of the conversation environment may be specific to the dataset.

The chatbot generating program 110 may leverage the one or more entities and the one or more actions determined at step 204, as well as additional information, such as, but not limited to, metadata provided by the user, metadata extracted from the dataset, in conjunction with supplied intents, generated intents, supplied utterances, generated utterances, supplied actions, and generated actions to create a conversation environment. The conversation environment may be specific to the dataset.

The chatbot generating program 110 may pair the one or more entities with one or more intents of the chatbot workspace. The one or more pairs of the one or more entities and the one or more intents may be expressed as an utterance. The chatbot generating program 110 may pair the one or more actions with the one or more intents of the chatbot workspace. The chatbot generating program may utilize the one or more supplied actions to pair the one or more determined actions with the supplied utterances.

The chatbot generating program 110 may utilize the utterances to train the conversation environment and recognize the intents and actions.

The chatbot generating program 110 may utilize those entities to update the supplied utterances connect the actions (e.g., answers) to appropriate intents in the chatbot workspace.

The chatbot generating program 110 may utilize a template file. The template file may be a standard file (e.g., chatbot platform agnostic file) that may be used to generate the chatbot based the dataset provided by the user and expressed as a chatbot workspace.

For example, the template file may have a supplied utterance "list <Column Header>" with the corresponding intent "retrieve values of a column." The chatbot generating program 110 using this supplied utterance and corresponding intent may leverage entities such as "restaurantType" in order to generate questions specific to the dataset and corresponding answers. The utterance may be, for example, "Please provide me all the different Italian restaurants in Brooklyn?" The chatbot generating program 110 may leverage two columns "restaurantType" and "restaurantName."

At 210, the chatbot generating program 110 initializes a chatbot. The chatbot generating program 110 may determine a chatbot platform prior to initializing a chatbot. The chatbot generating 110 may determine the chatbot platform based on a selection of a user.

The chatbot platform may generate a chatbot platform specific file converting the canonical workspace file to platform specific chatbot workspace based on the chatbot platform. The chatbot platform specific file may be used by the chatbot platform to initialize the chatbot.

The chatbot may perform actions based on utterances of the user, as discussed previously in step 206. The chatbot may derive an action based on a search of the associated rows correlating to a column header of the dataset using the one or more entities found in the utterance of the user.

The chatbot may handle multiple languages. The chatbot generating program 110 may utilize a translator to handle multiple languages. The chatbot generating program 110 may receive an utterance (e.g., question) by a user in any language and translate the utterance into the corresponding language of the dataset. The chatbot generating program may then translate the action (e.g., answer) corresponding to that utterance (e.g., question) into a preferred language of the user.

The chatbot may be able to directly handle meta-data related utterances (e.g., what features are in the data). For utterances related to lookup information based on specified entities or features the chatbot may utilize an in-memory database to create select-filter SQL queries. The chatbot can be extended utilize spatio-temporal queries and or invoke a data-specific handler available as a REST interface like natural language interfaces to queries (NLQ).

It may be appreciated that FIG. 2 provides only an illustration of one embodiment and do not imply any limitations with regard to how different embodiments may be implemented. Many modifications to the depicted embodiment(s) may be made based on design and implementation requirements.

Figure 3:
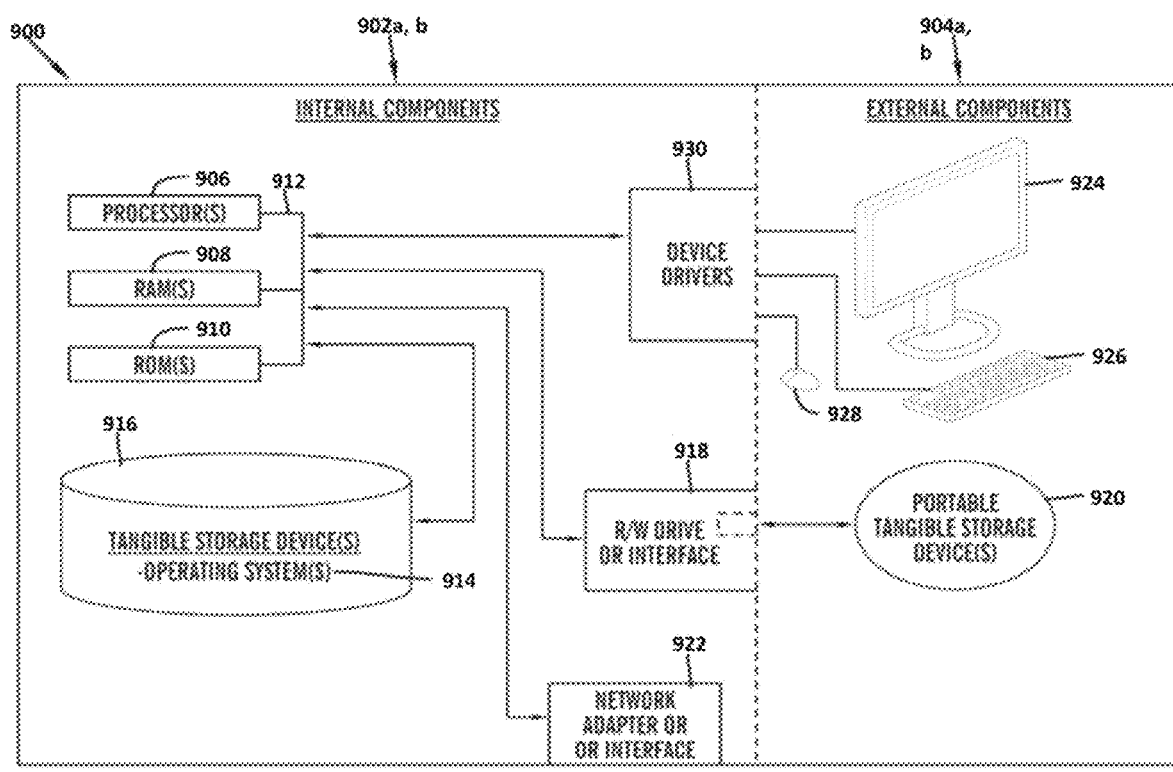
FIG. 3 is a block diagram of internal and external components of computers and servers depicted in FIG. 1 according to at least one embodiment.

FIG. 3 is a block diagram 900 of internal and external components of computers depicted in FIG. 1 in accordance with an illustrative embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902a, b and external components 904a, b illustrated in FIG. 3. Each of the sets of internal components 902a, b includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108, and the chatbot generating program 110a in client computer 102, and the chatbot generating program 110b in network server 112, may be stored on one or more computer-readable tangible storage devices 916 for execution by one or more processors 906 via one or more RAMs 908 (which typically include cache memory). In the embodiment illustrated in FIG. 3, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the chatbot generating program 110a and 110b can be stored on one or more of the respective portable computer-readable tangible storage devices 920, read via the respective R/W drive or interface 918 and loaded into the respective hard drive 916.

Each set of internal components 902a, b may also include network adapters (or switch port cards) or interfaces 922 such as a TCP/IP adapter cards, wireless wi-fi interface cards, or 3G or 4G wireless interface cards or other wired or wireless communication links. The software program 108 and the chatbot generating program 110a in client computer 102 and the chatbot generating program 110b in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the chatbot generating program 110a in client computer 102 and the chatbot generating program 110b in network server computer 112 are loaded into the respective hard drive 916. The network may comprise copper wires, optical fibers, wireless transmission, routers, firewalls, switches, gateway computers and/or edge servers.

Each of the sets of external components 904a, b can include a computer display monitor 924, a keyboard 926, and a computer mouse 928. External components 904a, b can also include touch screens, virtual keyboards, touch pads, pointing devices, and other human interface devices. Each of the sets of internal components 902a, b also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
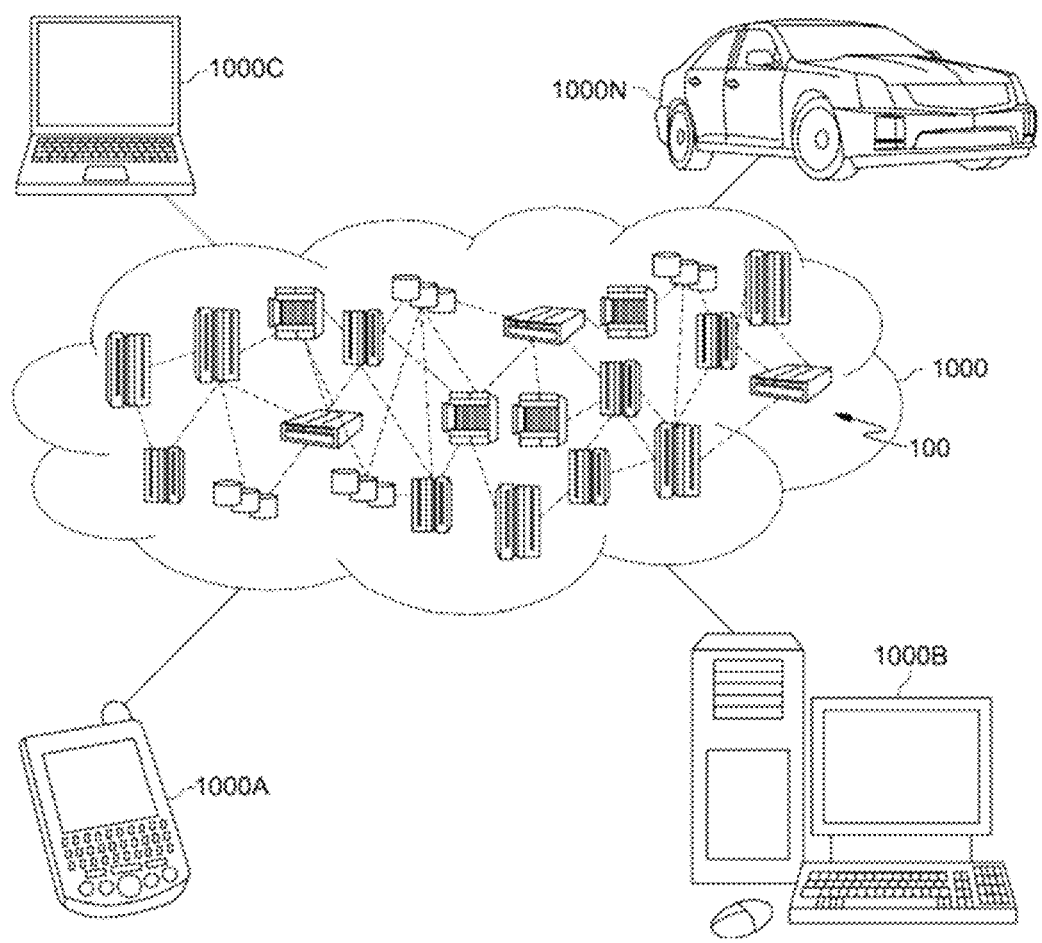
FIG. 4 is a block diagram of an illustrative cloud computing environment including the computer system depicted in FIG. 1, in accordance with an embodiment of the present disclosure.

Referring now to FIG. 4, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 4 are intended to be illustrative only and that computing nodes 100 and cloud computing environment 1000 can communicate with any type of computerized device over any type of network and/or network addressable connection (e.g., using a web browser).

Figure 5:
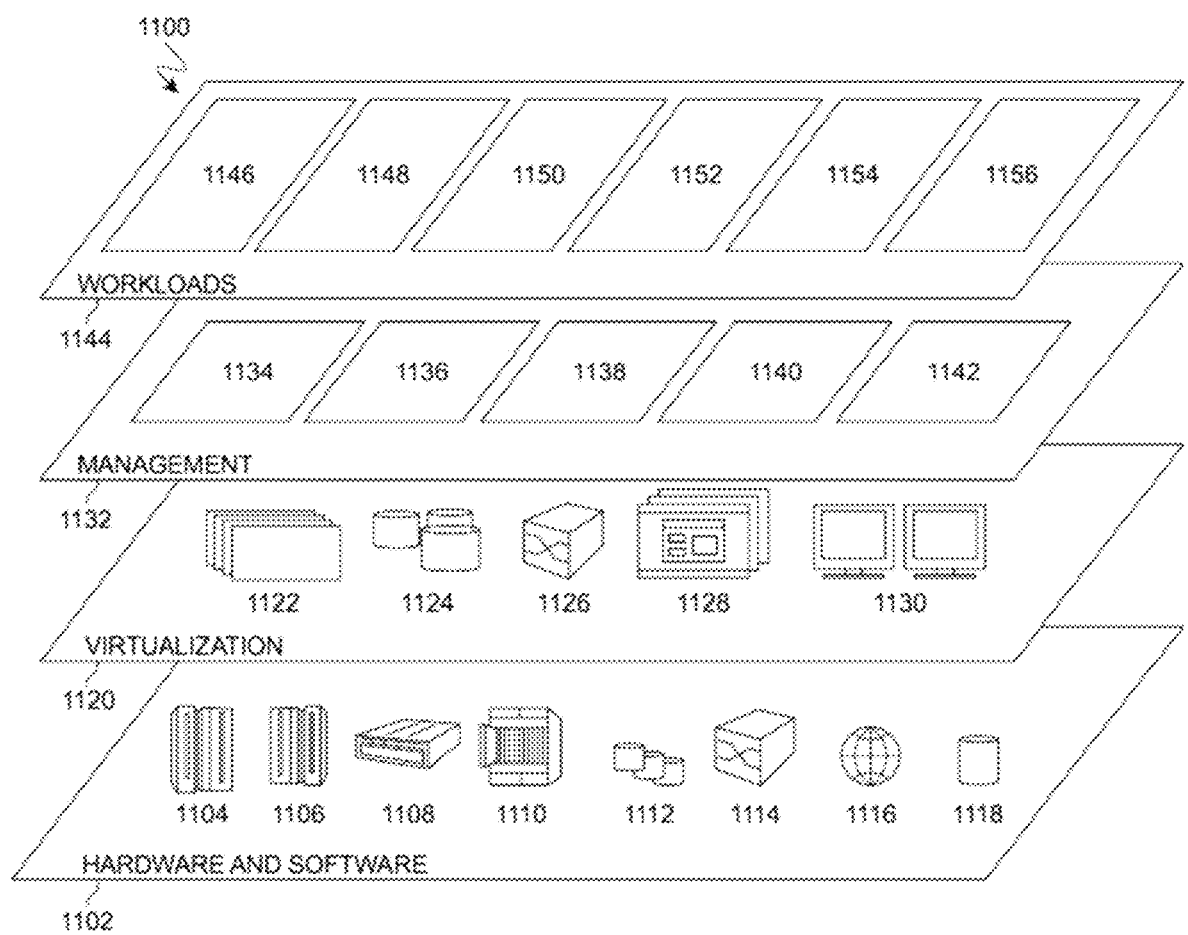
FIG. 5 is a block diagram of functional layers of the illustrative cloud computing environment of FIG. 4, in accordance with an embodiment of the present disclosure.

Referring now to FIG. 5, a set of functional abstraction layers 1100 provided by cloud computing environment 1000 is shown. It should be understood in advance that the components, layers, and functions shown in FIG. 5 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and chatbot generating 1156. A chatbot generating program 110a, 110b provides a way to analyze a dataset, generate a chatbot workspace, determine one or more entities, and generate a conversation environment.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for chatbot generating, the method comprising:

determining one or more entities based on at least one column header of a dataset;

determining one or more actions based on an associated row, the associated row corresponding to the at least one column header;

generating a conversation environment, wherein generating the conversation environment comprises pairing the one or more entities with one or more supplied intents of a chatbot workspace and pairing the one or more actions with one or more supplied utterances of the chatbot workspace, wherein the one or more supplied utterances are utilized to train the conversation environment;

determining a chatbot platform, wherein the chatbot platform is determined by a user;

generating a chatbot platform specific file;

initializing a chatbot on the chatbot platform, wherein the chatbot utilizes a trained conversation environment in recognizing an intent of user utterances; and receiving a natural language query on the chatbot platform, wherein the natural language query includes one or more user utterances, wherein the chatbot translates a language of the one or more user utterances received through the chatbot platform to a corresponding language of the dataset and derives an action to be performed based on a structured language query search of the at least one associated row correlating to the at least one column header of the dataset, wherein the action derived from the one or more user utterances received are translated into a preferred language of the user.

2. The method of claim 1, further comprising:

analyzing the dataset utilizing one or more techniques of introspection in conjunction with Natural Language Processing to extract one or more features from the dataset;

generating metadata based on the dataset; and generating a plurality of relevant utterances based on the metadata.

3. The method of claim 2, wherein the plurality of relevant utterances are generated by identifying relevant information and user request phraseology within the metadata generated based on the dataset.

4. The method of claim 2, wherein the one or more features extracted from the dataset are based on, at least one or more of, labels of the at least one column header, data in the at least one associated row, a data type in the at least one associated row, a range of values of the at least one associated row, or variables of the at least one associated row.

5. The method of claim 2, wherein the plurality of relevant utterances generated based on the metadata are utilized to retrain the conversation environment to recognize an intent of the user and identify the one or more entities corresponding to the intent of the user by updating the one or more supplied utterances of the chatbot workspace to connect the one or more actions with an updated utterance based on the one or more entities identified which correspond to the intent of the user.

6. The method of claim 1, wherein the conversation environment is stored as a template file and is comprised of at least entities, intents, utterances, and actions.

7. The method of claim 1, wherein the chatbot workspace is stored using a platform agnostic file format, wherein the chatbot platform specific file is generated by converting the platform agnostic file format to the chatbot platform specific file based on the chatbot platform determined by the user.

8. The method of claim 1, wherein the chatbot utilizes an in-memory database to create select-filter structured query language queries based on the user utterances received from the user within a natural language interface to queries interface.

9. The method of claim 1, wherein the search of the at least one associated row correlating to the at least one column header of the dataset is determined using the one or more entities identified within the user utterances received.

10. A computer system for chatbot generating, comprising:

one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:

determining one or more entities based on at least one column header of a dataset;

determining one or more actions based on an associated row, the associated row corresponding to the at least one column header;

generating a conversation environment, wherein generating the conversation environment comprises pairing the one or more entities with one or more supplied intents of a chatbot workspace and pairing the one or more actions with one or more supplied utterances of the chatbot workspace, wherein the one or more supplied utterances are utilized to train the conversation environment;

determining a chatbot platform, wherein the chatbot platform is determined by a user;

generating a chatbot platform specific file;

initializing a chatbot on the chatbot platform, wherein the chatbot utilizes a trained conversation environment in recognizing an intent of user utterances; and receiving a natural language query on the chatbot platform, wherein the natural language query includes one or more user utterances, wherein the chatbot translates a language of the one or more user utterances received through the chatbot platform to a corresponding language of the dataset and derives an action to be performed based on a structured language query search of the at least one associated row correlating to the at least one column header of the dataset, wherein the action derived from the one or more user utterances received are translated into a preferred language of the user.

11. The computer system of claim 10, further comprising:

analyzing the dataset utilizing one or more techniques of introspection in conjunction with Natural Language Processing to extract one or more features from the dataset;

generating metadata based on the dataset; and generating a plurality of relevant utterances based on the metadata.

12. The computer system of claim 10, wherein determining the one or more actions further comprises:

searching the at least one associated row using the one or more entities.

13. The computer system of claim 10, wherein the conversation environment is stored on a template file and is comprised of at least entities, intents, utterances, and actions.

14. The computer system of claim 10, wherein the chatbot utilizes an in-memory database to create select-filter structured query language queries based on the user utterances received from the user within a natural language interface to queries interface.

15. A computer program product for chatbot generating, comprising:
one or more non-transitory computer-readable storage media and program instructions stored on at least one of the one or more tangible storage media, the program instructions executable by a processor to cause the processor to perform a method comprising:
determining one or more entities based on at least one column header of a dataset;
determining one or more actions based on an associated row, the associated row corresponding to the at least one column header;
generating a conversation environment, wherein generating the conversation environment comprises pairing the one or more entities with one or more supplied intents of a chatbot workspace and pairing the one or more actions with one or more supplied utterances of the chatbot workspace, wherein the one or more supplied utterances are utilized to train the conversation environment;
determining a chatbot platform, wherein the chatbot platform is determined by a user;
generating a chatbot platform specific file;
initializing a chatbot on the chatbot platform, wherein the chatbot utilizes a trained conversation environment in recognizing an intent of user utterances; and
receiving a natural language query on the chatbot platform, wherein the natural language query includes one or more user utterances, wherein the chatbot translates a language of the one or more user utterances received through the chatbot platform to a corresponding language of the dataset and derives an action to be performed based on a structured language query search of the at least one associated row correlating to the at least one column header of the dataset, wherein the action derived from the one or more user utterances received are translated into a preferred language of the user.

16. The computer program product of claim 15, wherein determining the one or more actions further comprises:
searching the at least one associated row using the one or more entities.

17. The computer program product of claim 15, wherein the conversation environment is stored on a template file and is comprised of at least entities, intents, utterances, and actions.

18. The computer program product of claim 15, further comprising:
analyzing the dataset utilizing one or more techniques of introspection in conjunction with Natural Language Processing to extract one or more features from the dataset;
generating metadata based on the dataset; and
generating a plurality of relevant utterances based on the metadata.

19. The computer program product of claim 15, wherein the chatbot utilizes an in-memory database to create select-filter structured query language queries based on the user utterances received from the user within a natural language interface to queries interface.

* * * * *